Nov. 12, 1929.  A. J. ENNEN  1,735,240
SAFETY DEVICE FOR RIP SAWS
Filed Sept. 5, 1927
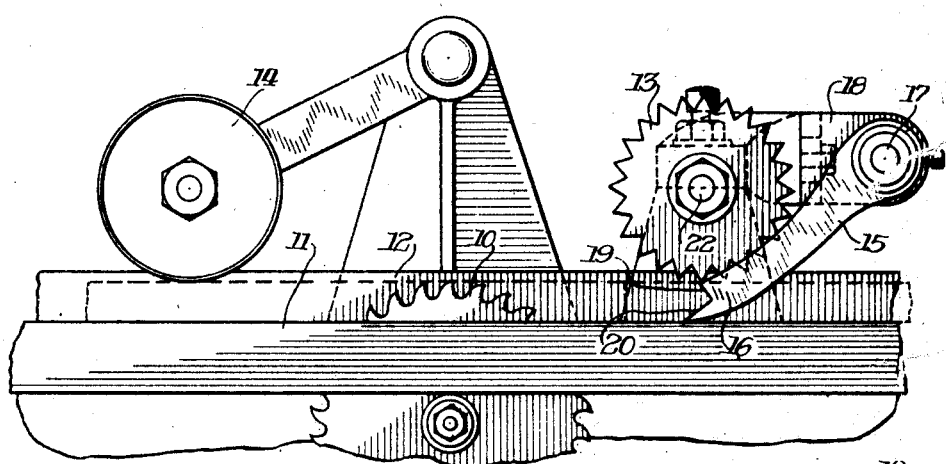
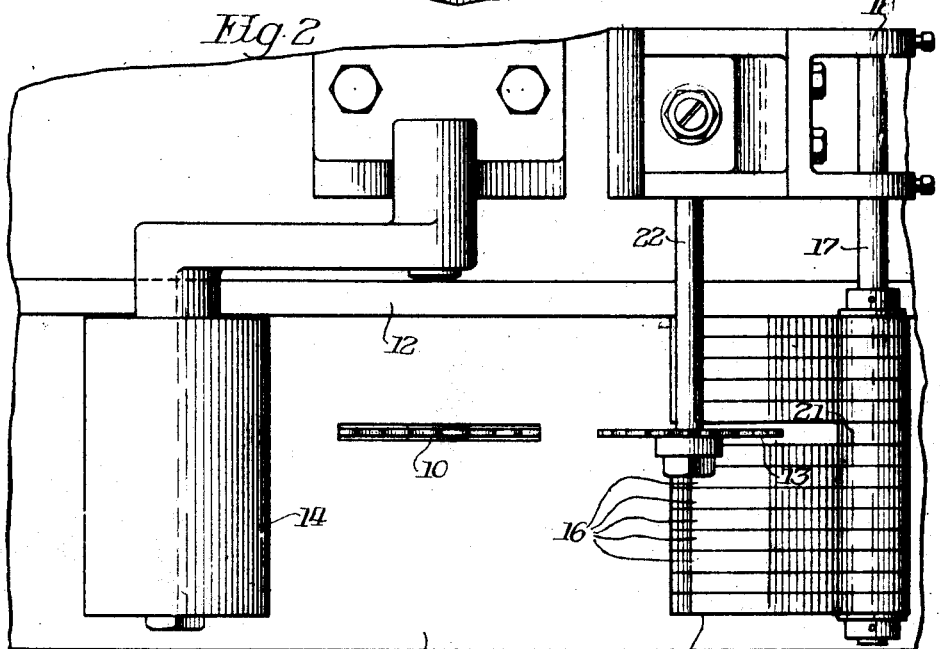
Inventor
Anthony J. Ennen
By Cromwell, Greist & Warden
Attys Patented Nov. 12, 1929

1,735,240

UNITED STATES PATENT OFFICE

ANTHONY J. ENNEN, OF CHICAGO, ILLINOIS

SAFETY DEVICE FOR RIP SAWS

Application filed September 5, 1927. Serial No. 217,545.

The operator of a power-driven rip saw, when feeding boards to the saw, runs the risk of being seriously injured should the end of one of the boards, after passing the feeding device in approaching the saw, be caught by the saw and thrown back.

The object of the present invention is to provide a novel saftey device which will enable the operator of such a saw to feed boards to the same without danger of injury.

Other objects and advantages of the invention will be evident to those skilled in the art upon a full understanding of the construction, arrangement and operation of the safety device.

One form of the invention is presented herein for the purpose of exemplification, but it will of course be appreciated that the invention is susceptible of embodiment in other forms coming equally within the scope of the appended claim.

In the accompanying drawing:

Fig. 1 is a fragmentary side view of a power-driven rip saw equipped with the safety device of the invention; and Fig. 2 is a fragmentary plan view of the same.

The assembly illustrated in the drawing includes a rip saw 10, a feed table 11, a gauge 12 along one side of the table, a feeder 13 at the front of the saw, a feeder 14 at the rear of the saw, and a safety device 15.

The feeder 13, which is in the form of a narrow spur wheel, serves to move the boards along the gauge up to the saw, and the feeder 14, which is in the form of a wide roller, serves to move the boards along the gauge away from the saw. Both feeders are driven by suitable power-transmitting mechanism.

The safety device 15 consists of a transverse row of rearwardly and downwardly inclined fingers 16. The upper ends of the fingers are pivoted to a rod 17 which is mounted in a vertically adjustable bracket 18, and the lower ends of the fingers rest upon the table and are shaped to provide rearwardly facing gripping dogs 19 approached by forwardly and upwardly inclined surfaces 20.

The fingers are arranged at both sides of the feeder 13, and are separated at the location of the feeder by a spacing collar 21 on the rod 17. The lower ends of the fingers, which ride upon the tops of the boards passing beneath the feeder, are arranged approximately in transverse alignment with the bottom of the feeder, whereby to allow the fingers to drop onto the table into safety positions as soon as the end of a board on which the fingers are riding passes from under the feeder in approaching the saw.

When a board approaches the feeder, it of course raises the fingers immediately in front of it up into temporarily inoperative positions, leaving all of the other fingers in sofety positions. In the event a board is kicked back by the saw after it leaves the feeder, it will be stopped abruptly by the dogs on the lower ends of the fingers.

Instead of only one feeder 13, two or more similar feeders may be mounted on the shaft 22, requiring a corresponding number of collars 21 on the rod 17. When it is desired to move the gauge 12 nearer the saw, the table, which is usually vertically adjustable, may be lowered temporarily and as many of the fingers as are lapped by the gauge in its new position may be swung around the rod 17 into positions wherein they will rest on the top of the shaft 22. Or if the gauge is low enough to permit, the excess fingers may rest upon the top of the gauge.

I claim:

The combination, with a rotary implement, a table, and means in front of the implement for feeding stock along the table to the implement, of a rod extending across the table in front of the implement, and a row of fingers pivoted to the rod and extending downwardly and rearwarly at an inclination therefrom, said fingers having shoulders forming dogs thereon above the lower ends of the fingers to engage with the end of the stock in case the latter after leaving the fingers is caught by the implement and thrown back.

In testimony whereof I have hereunto subscribed my name.

ANTHONY J. ENNEN.